United States Patent Office 3,798,208
Patented Mar. 19, 1974

3,798,208
MODIFICATION OF PROTEIN WITH ETHYLENIMINE
David M. Miller, Skaneateles, N.Y., assignor to
Swift & Company, Chicago, Ill.
No Drawing. Filed May 8, 1972, Ser. No. 251,377
Int. Cl. A23j 3/02; C07g 7/00
U.S. Cl. 260—119                                            8 Claims

ABSTRACT OF THE DISCLOSURE

An improved method for preparing protein derivatives comprising reacting protein with ethylenimine in a non-aqueous medium in the presence of a Lewis acid catalyst. The reaction product is a modified protein characterized by an increased isoelectric pH.

---

The present invention relates to improved modified protein products and to a method for preparing same. More particularly, this invention relates to a method for increasing the isoelectric pH of proteins by reacting the protein with ethylenimine in an organic solvent in the presence of a Lewis acid.

Proteins find many industrial and food purpose applications in commerce. Albumin, gelatin, casein and soybean protein are used in many food products and adhesive formulations. The broad use of proteins in industry and food processing can be traced to the complex nature of proteins. Proteins are long-chain, bio-polymers of high molecular weight, composed of amino acids joined together by peptide linkages. Due to the size and shape of the protein molecule, the protein may lend increased viscosity to a particular system. Also, the length of the protein "chain" may impart a fibrous structure, or enhance adhesive properties. In solution, the electrical character of the protein molecule may enable the protein to flocculate suspended solids, or provide a nucleus upon which to precipitate a material.

Proteins, however, find their industrial application restricted to those uses in which the inherent properties of the native protein are desired. One important inherent characteristics of native protein is the charge distribution. By this is meant the relative numbers of positively and negatively ionized groups present in a protein molecule at a given pH value. The charge distribution on a protein molecule is extremely important inasmuch as it influences other basic characteristics of the protein molecule. For example, the solubility of a protein is largely a function of the charge distribution on the individual protein molecules.

Proteins are ampholytes; that is, they possess both acidic and basic characteristics, depending on the pH. The amino acid composition of a given protein will determine the charge distribution on the protein at any given pH value. Thus in a typical protein molecule at pH 7.0 the primary amino group ($-CHNH_3^+$) of lysine will be positively charged, while the carboxyl groups $$(-COO^-)$$

of glutamic and aspartic acid will be negatively charged. Other groups such as the branched hydrocarbon chain of isoleucine, the aromatic hydroxyl of tyrosine, the amide group of asparagine and the sulfhydryl of cystine contain no charge at pH 7, and thus do not contribute to the overall charge of the protein molecule.

If the pH of the solution containing the protein were raised to pH 10, the ionic character of the molecule would change. In addition to the negatively charged carboxyl groups, sulfhydryl and hydroxyl groups would also be negatively charged. Moreover, the primary amino groups of lysine, which were positively charged at pH 7, would become neutral (no charge). Thus an increase in pH tends to increase the electronegative character of the protein molecule. On the other hand, if the pH of the solution were adjusted to pH 4, the molecule as a whole would characteristically become more electropositive as the primary amino groups would be positively charged, whereas the carboxyl, sulfhydryl, and hydroxyl groups would contain no charge.

If a charged molecule is placed in a solution containing two electrodes, and an electrical circuit is completed through the solution, the molecule will migrate to the electrode of opposite charge. Conversely, an isoionic molecule (no net charge) will remain stationary if placed in such an electrical field. When dealing with an isoionic protein in solution, this condition is given the special name of isoelectric point, and the pH (acid-base concentration) of the solution in which a protein is at its isoionic point is called the pI or isoelectric pH.

Most well-known proteins have inherently low isoelectric points. For example, casein has a pI of about 4.5–4.6; and isolated soybean protein, a heterogeneous combination of proteins of various molecular weights, has a pI of from about 4.5–5.0. Pepsin, urease, insulin, gelatin, myosin, and albumin, to name just a few well-known and useful proteins, all have normal isoelectric points below pH 6.0. The low isoelectric pH of most common proteins limits their usefulness to applications in which a low pI value is compatible. If the pI value of a protein could be modified to a higher value, e.g., pI 9, then the industrial applications of the protein would be greatly expanded. The most important benefit deriving from the upward modification of a protein's isoelectric point is that its solubility will be increased at lower pH values, but decreased at higher pH values. Another example of the usefulness of modifying a protein's charge distribution can be seen in the case of enzymes such as pepsin and urease which may have their pH of maximum catalytic ability altered as a result of changing the molecular charge distribution.

The prior art has long-recognized that the pI value of a protein may be increased by modifying the charge distribution of the protein through a reaction which adds basic groups to the protein molecule. For example, see British Pat. 678,103 to Allied Colloids Ltd. This patent discloses the reaction of casein with ethylenimine in an aqueous reaction medium, the reaction being catalyzed by the presence of a free proton acid such as hydrochloric acid. It is important that the pH of the reaction medium be retained between pH 4–10, and that the ethylenimine be added to the reaction medium very slowly so that polymerization of the ethylenimine is avoided. This method of protein modification presents numerous problems to those in the art. For example, the desired reaction must compete with significant side reactions such as polymerization and hydrolysis of the ethylenimine reagent. Also, the protracted addition of ethylenimine reagent to the reaction medium necessarily results in a rather long total reaction time. Moreover, the pH of the reaction medium must be closely controlled in order to obtain desirable results. It would thus be a significant advance in the prior art to introduce a method of reacting a protein with ethylenimine, which method substantially overcomes the aforementioned prior art problems.

It is therefore a principal object of the present invention to provide an improved method for modifying the physiochemical properties of protein by selective manipulation of the protein isoelectric point.

Another object of the invention is to provide an improved method for reacting a protein with ethylenimine in such a manner that competing side reactions are minimized.

A further object of the invention is to provide an improved method for reacting a protein with ethylenimine without the necessity of having to control the pH of the reaction medium.

It is also an object of the present invention to provide an improved method for reacting a protein with ethylenimine in a more economical and rapid manner than has been possible heretofore.

Other objects of the present invention will be apparent to one skilled in the art from the following detailed description of the invention.

Generally, the present invention comprises reacting a protein with ethylenimine in an organic reaction medium, and in the presence of a catalytic amount of a Lewis acid. It has heretofore been well known in the prior art that proteins should generally be reacted in an aqueous medium. This is due to the fact that a protein tends to "swell" in water; that is, the protein chains begin to unwind, thereby exposing reactive sites. On the other hand, it has been known in the art that a protein does not swell in a non-aqueous medium. Hence, it has been commonly believed that proteins are much more reactive in an aqueous medium than in an non-aqueous medium. In the present invention, however, it has been surprisingly discovered that by utilizing an organic solvent meduim, a protein may be made to react rapidly with ethylenimine so as to yield a protein derivative having an increased isoelectric pH. Moreover, the prior art problems of pH control, lengthy reaction time and competing side reactions are avoided or are significantly reduced.

In general, almost any protein may be reacted with ethylenimine in accordance with present invention. The invention is specifically directed to modification of proteins having relatively low natural isoelectric pH points, i.e., a pI of less than about 6.0. The most important proteins in this category include casein, soy protein, and base-cured gelatin. Other proteins which may be modified in accordance with this invention include acid-cured gelatin, albumin, pepsin, urease, insulin, and myosin. In order for the reaction to proceed efficiently, it is important that the protein be well dispersed throughout the organic solvent so as to form a colloidal dispersion. Therefore, the protein should be in a finely divided form; for example, casein powder or soy protein powder would be a preferred form.

The reaction medium may be any organic solvent, polar or non-polar, which is inert to ethylenimine (will not react with ethylenimine), and which possesses a boiling point above the reaction temperature. Suitable alkanes include hexane, heptane, octane, nonane, decane, undecane, dodecane, tridecane, tetradecane and pentadecane. Suitable alkenes include hexene, heptene, octene, nonene, decene, dodecene and 2,3-dimethyl-2-butene. Suitable cyclic aliphatic hydrocarbons include cyclohexane, cycloheptane, cyclooctane, methyl cyclohexane, methyl cyclopentane, and cyclohexene. Suitable cyclic aromatic hydrocarbons include benzene, xylene, toluene, ethylbenzene, n-propyl benzene, isopropyl benzene, n-butyl benzene and isobutyl benzene. Also, certain polar organic solvents such as ethylene dichloride, dimethyl formamide and dimethyl sulfoxide may be used. The quantity of solvent required will be that amount necessary to thoroughly disperse the protein. Generally, the ratio of solvent to protein will be greater than about 3 to 1 by weight.

The specific modifying reagent contemplated by this invention is ethylenimine, the 3-membered cyclic, nitrogen-containing compound

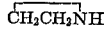

The total amount of ethylenimine added to the protein dispersion should be in the range of from about a 2-4 molar excess of the ethylenimine per mole of primary amino and acidic carboxyl reactive sites of the protein. Thus, if one mole of a hypothetical protein having two carboxyl acid groups ($COO^-$) and two primary amino groups ($-CHNH_3^+$) per molecule is dispersed in the organic solvent, there are four moles of reactive sites, and the amount of ethylenimine required would be from about 8-16 moles. Thus the moles of ethylenimine required in any given reaction is a function of not only the number of moles of protein in the reaction medium, but also the number of reactive carboxyl and primary amino sites per molecule on the particular protein being reacted. One skilled in the art could rapidly determine the number of reactive sites per molecule of any given protein by conducting an amino acid analysis.

The reaction is catalyzed by the presence of a catalytic amount of a Lewis acid. Lewis acids are "electron pair acceptors," i.e., compounds in which at least one atom has only an open sextet of electrons, or compounds in which no open sextet exists but in which the octet of electrons about some atom can be expanded under the influence of an "electron pair donor" compound (a Lewis base). Although any Lewis acid would catalyze the reaction, different Lewis acids will result in different reaction rates. The preferred Lewis acid used in accordance with this invention is boron trifluoride etherate. Other Lewis acids which may be used include aluminum chloride, stannic chloride, stannic fluoride, stannic bromide, zinc chloride, ferric chloride, ferric bromide, boron trifluoride, boron trichloride, boron tribromide, antimony pentafluoride, antimony pentachloride, antimony trichloride, titanium fluoride, titanium chloride, titanium bromide, zirconium chloride, gallium chloride, gallium bromide, cadmium chloride, beryllium chloride, uranium chloride and bismuth chloride. Only a small amount of Lewis acid is required to adequately catalyze the reaction. Of course, larger amounts may be used, but would be uneconomical. Usually, the amount of Lewis acid added to the reaction medium should be sufficient to obtain at least a 0.05 molar concentration of the catalyst in the solvent. About 0.1 molar amounts of the Lewis acid are preferred.

Generally, the reaction is carried out at from about 0° C. to about 40° C., and a temperature range of from about 0° C. to about 20° C. is preferred. Higher temperatures may be employed, but competitive reactions such as hydrolysis of the ethylenimine become significant at substantially higher temperatures. At any rate, the reaction temperature should not exceed about 57° C. which is the boiling point of ethylenimine. Since the protein modification reaction is exothermic, the reaction vessel should be cooled during the reaction. Usually the reaction will be initiated at about ice bath temperatures (0° C.) and allowed to rise gradually due to the reaction exotherm.

The rate of addition of the ethylenimine reagent to the protein-solvent dispersion will depend upon how efficiently the reaction medium is cooled. If the reaction vessel is efficiently cooled so as to rapidly remove heat evolved, then the ethylenimine may be added to the reaction medium at a rate of up to about 10–15% of the total ethylenimine per minute. Since the protein will react with the ethylenimine present in the reaction quite rapidly, usually within about 2–6 minutes, it can be seen that the total reaction may be carried out in a relatively short time.

When the reaction between the protein and ethylenimine has been completed, the modified protein reaction product may be washed, as with benzene or ethyl alcohol, to remove unreacted reagents, various salts and small chain molecules. The dried reaction product is characterized by a substantially altered pI value, usually in the range of about pI 7–10.

Although not wishing to be bound by theory, it is believed that the presence of a Lewis acid in the organic reaction medium results in a condition analogous to a slightly acidic pH i.e. a pH below about 7.0. Under these conditions the primary amino groups would be positively ionized, and most of the acidic carboxyl groups would be negatively ionized. The reaction between the protein and ethylenimine involves cleavage of the ethylenimine molecule between one of the nitrogen-carbon bonds to yield an ionized, highly reactive ethylenimine radical which will react with the acidic carboxyl groups and primary amino groups of the protein. In this manner, the carboxyl and primary amino groups are neutralized, and the charge distribution of the protein molecule is substantially altered.

The modified protein reaction products of this invention may find application in any industrial use where a protein of high pI value is desired. One important use of these proteins is in protein film microencapsulation processes wherein the ingredient to be encapsulated is of such a nature as to require a protein cellwall film having a high pI value. An example is the encapsulation of certain flavor ingredients or acid sensitive dyes in gelatin film. Other applications of the modified protein of this invention include its use as a flocculating agent and its use in various coatings.

The following examples are set forth for the purpose of illustration only, and are not to be construed as limiting the present invention in any respect.

EXAMPLE I 30 grams of a standard soy protein isolate were dispersed in 200 ml. of cold benzene. The soy isolate contained about 90% protein and had a natural pI of about 4.5. Sufficient boron trifluoride etherate complex was added to provide a 0.1 M concentration. Thereafter, 21.5 grams of ethylenimine, about a fourfold molar equivalent excess, was added dropwise. All additions were made at ice-bath temperature and were somewhat exothermic. The reaction mixture was then heated to 40° C. and held for 10 minutes. Following the reaction, the reaction solids were washed with benzene and ethyl alcohol. This washed reaction product was then added to water and seemed to go readily into solution. No apparent change in solubility occurred after dialysis. The lyophilized product after dialysis had a pI of 9.5.

EXAMPLE II 350 grams of a soy protein isolate having a normal pI of about 4.5 was dispersed in 2 liters of cold benzene. Enough boron trifluoride etherate was added to make a 0.1 M solution, and about a fourfold molar equivalent excess, 250 grams, of ethylenimine was added dropwise with vigorous agitation. The mixture was then held at about 40° C. for 10 minutes, and then dialized against distilled water for one week. The dialized product was spray-dried, and upon analysis exhibited a pI of 8.8.

EXAMPLE III 30 grams of a commercial casein, containing about 90% protein with a normal isoelectric point pH of 4.8, was dispersed in 200 ml. of cold benzene. The solution was cooled to about 3° C. and 4 ml. of boron trifluoride etherate was added, making the solution about 0.1 M in the Lewis acid. Thereafter, 25.8 grams of ethylenimine, about a fourfold molar equivalent excess, was added over a 15 minute period. The temperature rose during this addition about 10° C. despite cooling. Following addition of all the ethylenimine, the reaction mixture was heated to about 40° C. for 10 minutes with constant stirring. The mixture was then dialized and lyophilized, and upon analysis exhibited a pI of about 8.0.

Obviously many modifications and variations of the invention may be made without departing from the spirit and scope thereof, and therefore, only those limitations should be imposed as are indicated in the appended claims.

I claim:

1. An improved method for modifying the pI value of protein comprising: dispersing a protein selected from the group consisting of casein, soybean, protein, gelatin, pepsin, urease, insulin, myosin and albumin, and having a normal pI value of 4–6, in an organic solvent which is inert to ethylenimine; adding a catalytic amount of a Lewis acid to said protein dispersion; adding ethylenimine to the dispersion in the amount of about a 2–4 molar excess per mole of protein acidic carboxyl and basic primary amino reactive sites; and reacting the protein with the ethylenimine at a temperature of greater than 0° C.

2. The method of claim 1 wherein the ethylenimine is added at a rate of not greater than about 15% by weight of the total ethylenimine per minute.

3. The method of claim 2 wherein the solvent to protein ratio is greater than about 3:1 by weight, and the reaction is carried out at a temperature of from about 0° C. to about 40° C.

4. The method of claim 3 wherein the reaction is carried out at from about 0° C. to 20° C.

5. The method of claim 3 wherein the protein is casein.

6. The method of claim 3 wherein the protein is soy protein isolate.

7. The method of claim 3 wherein the Lewis acid is selected from the group consisting of boron trifluoride etherate, aluminum chloride, stannic chloride, stannic fluoride, stannic bromide, zinc chloride, ferric chloride, ferric bromide, boron trifluoride, boron trichloride, boron tribromide, antimony pentafluoride, antimony pentachloride, antimony trichloride, titanium fluoride, titanium chloride, titanium bromide, zirconium chloride, gallium chloride, gallium bromide, cadmium chloride, beryllium chloride, uranium chloride, and bismuth chloride.

8. The method of claim 3 wherein the Lewis acid is boron trifluoride etherate.

References Cited

UNITED STATES PATENTS

| | | | |
|---|---|---|---|
| 2,131,145 | 9/1938 | Schlack | 260—119 X |
| 2,220,441 | 11/1940 | Esselmann et al. | 260—112 UX |

FOREIGN PATENTS

| | | |
|---|---|---|
| 678,103 | 8/1952 | Great Britain. |

HOWARD E. SCHAIN, Primary Examiner

U.S. Cl. X.R.

195—68; 260—112 R, 112.7, 117, 121, 123.5